US007739002B2

(12) United States Patent
Shen et al.

(10) Patent No.: US 7,739,002 B2
(45) Date of Patent: Jun. 15, 2010

(54) METHOD OF NEAR REAL-TIME BAND JAMMING PREVENTION

(75) Inventors: Sy-Kang Shen, Taipei (TW); Li-Wei Mao, Jhonghe (TW); Cheu-Ming Bow, Tucheng (TW); Hsien-Chiarn Lee, Taipei (TW); Ming-Chieh Cheng, Jhongli (TW)

(73) Assignee: Chung Shan Institute of Science and Technology Armaments Bureau, M.N.D., Taoyuan County (TW)

( * ) Notice: Subject to any disclaimer, the term of this patent is extended or adjusted under 35 U.S.C. 154(b) by 803 days.

(21) Appl. No.: 11/586,533

(22) Filed: Oct. 26, 2006

(65) Prior Publication Data

US 2008/0103649 A1 May 1, 2008

(51) Int. Cl.
*G06F 19/00* (2006.01)
(52) U.S. Cl. .......................................................... 701/2
(58) Field of Classification Search ....................... None
See application file for complete search history.

(56) References Cited

U.S. PATENT DOCUMENTS

2005/0143013 A1* 6/2005 Jha ............................ 455/69
2007/0037572 A1* 2/2007 Nanba .................... 455/426.2

* cited by examiner

*Primary Examiner*—Michael J. Zanelli
(74) *Attorney, Agent, or Firm*—Rosenberg, Klein & Lee

(57) ABSTRACT

The present invention relates to a method of near real-time band jamming prevention, which provides a vehicle controller with the ability of examining autonomously the communication band between itself and a remote guidance and control apparatus, so that the vehicle controller can judge the jamming extent suffered by the communication band between the vehicle controller and the remote guidance and control apparatus. Thereby, the vehicle controller can execute corresponding actions in accordance with the judgment result of the method of near real-time band jamming prevention according to the present invention. In particular, when multiple vehicles operate synchronously and operators of the vehicles have no time to handle at the same time, the method of near real-time band jamming prevention according to the present invention provides the vehicle controllers with the ability of judging autonomously the communication band with preferred received signal strength intensity. Thereby, the channel for data link between the vehicle controller and the remote guidance and control apparatus is maintained normally and continuously.

14 Claims, 6 Drawing Sheets

METHOD OF NEAR REAL-TIME BAND JAMMING PREVENTION

FIELD OF THE INVENTION

The present invention relates to a method of band jamming prevention, and particularly to a method of near real-time band jamming prevention.

BACKGROUND OF THE INVENTION

Radio-frequency (RF) technology is a transmission technology having been used for a long time. It is applied to various radio broadcasting and wireless network applications. Radio broadcasting is a widely known application technology. In early days, radio broadcasting includes frequency-modulation (FM) and amplitude-modulation (AM) broadcasting stations. Nowadays, radio broadcasting further includes digital broadcasting, such as digital video broadcasting (DVB) and digital audio broadcasting (DAB). Wireless networks provide users with the ability of wirelessly connecting to the networks with electronic apparatuses supporting the network transmission interface, thereby increasing mobility and convenience for users using the electronic apparatuses. However, no matter radio broadcasting or wireless networks, the problem of band jamming is inevitable. Accordingly, quality of data transmission in radio broadcasting or wireless networks will be affected by jamming sources. Besides, unmanned vehicle systems using radio interfaces for data transmission or control signals will be thereby affected by jamming sources as well.

Unmanned aerial vehicle systems include at least an aerial vehicle, at least a remote guidance and control apparatus, at least a data link, and a payload. Normally, the data link of a relatively complete unmanned aerial vehicle system possesses communication channels in a plurality of frequency bands for ensuring signals transmitted between the remote guidance and control apparatus and the unmanned aerial vehicle will not lock out. The application technologies of modern remote guidance and control apparatus and the data link have developed to the extent that a guidance and control station can operate a plurality of unmanned aerial vehicles of different models synchronously, or a guidance and control station can remotely guide and control a plurality of unmanned aerial vehicles of the same model synchronously. When a plurality of unmanned aerial vehicles operates synchronously and is remotely guided and controlled by a single remote guidance and control apparatus, operators of the remote guidance and control apparatus can not judge immediately communication quality according to the communication conditions between the unmanned vehicles and the remote guidance and control apparatus for executing corresponding correcting processes. In particular, when the communication signals between the unmanned vehicles and the remote guidance and control apparatus is jammed by unidentified strong signal waves, it is even necessary to perform corrections for improving communication quality.

Although in general, unmanned vehicles possesses the ability of autonomic lockout motion, when the communication signals between the remote guidance and control apparatus and the unmanned vehicles are lost, the remote guidance and control apparatus will not be able to acquire the locations of the unmanned vehicles. In particular, under the situation of a plurality of unmanned aerial vehicles operating synchronously, the communication conditions between the remote guidance and control apparatus and the plurality of unmanned aerial vehicles are more complex. If the communication signals between the remote guidance and control apparatus and one of the unmanned vehicles are lost, the unmanned aerial vehicle with signals lost will impact with other unmanned aerial vehicles, or the unmanned aerial vehicle with signals lost will impact with manned aerial vehicles, and thereby irretrievable disasters will result. Accordingly, when a single remote guidance and control apparatus remotely guides and controls multiple unmanned vehicles that are operating under complicated environment with a plurality of data links, jamming on the data link between each of the unmanned vehicles and the remote guidance and control apparatus by other data links is inevitable. Consequently, unexpected out-of-control situations on the unmanned vehicles will result.

FIG. 1A shows a schematic diagram of uplink jamming on an unmanned vehicle system according to the prior art, and FIG. 1B shows a schematic diagram of downlink jamming on an unmanned vehicle system according to the prior art. The difference between FIG. 1A and FIG. 1B is that the jamming source 10 in FIG. 1A drives directly the unmanned vehicle 20 unable to receive the control signals of the remote guidance and control apparatus 30 smoothly, and consequently causes the remote guidance and control apparatus. 30 unable to control the unmanned vehicle 20 smoothly. The jamming source 10 in FIG. 1B jams the remote guidance and control apparatus 30 from transmitting control signals to the unmanned vehicle 20, and thereby causes the remote guidance and control apparatus 30 unable to detect the status of the unmanned vehicle 20 smoothly. Besides, in addition to unmanned aerial vehicles, there exists a plurality of manned aerial vehicles in the air. There also exists at least one frequency band of communication channels between each of the manned aerial vehicles and the corresponding ground control station. Thereby, the frequency bands used by the plurality of manned aerial vehicles are a plurality of jamming sources for the communication channels between the unmanned aerial vehicles and the remote guidance and control apparatus. Therefore, it is necessary that the unmanned aerial vehicles or the remote guidance and control apparatus 30 are capable of judging unjammed frequency bands, and of switching the communication channels therebetween to the unjammed frequency bands, so that the remote guidance and control apparatus can continuously control the unmanned aerial vehicles.

According to the problems described above, a novel method of jamming prevention capable of overcoming the traditional drawback of signal loss between the remote guidance and control apparatus and the unmanned vehicles, and of preventing near real-timely jamming sources affecting communications therebetween is highly desired. The method of near real-time band jamming prevention for remote guidance and control apparatuses with multiple frequency bands according to the present invention can solve the problem describe above.

SUMMARY

The purpose of the present invention is to provide a method of near real-time band jamming prevention for a vehicle and a remote guidance and control apparatus with a plurality of communication bands. The method provides the vehicle controller of the vehicle and the remote guidance and control apparatus with the ability of switching real-timely from a jammed communication band to another communication band with better communication quality, so that the transmission channel for data link between the vehicle controller and the remote guidance and control apparatus is maintained.

Another purpose of the present invention is to provide a method of near real-time band jamming prevention for a plurality of vehicles and a remote guidance and control apparatus with a plurality of communication bands, respectively. The method provides the plurality of vehicle controllers of a plurality of vehicles and the remote guidance and control apparatus the ability of switching real-timely from a jammed communication band to another communication band with better communication quality, respectively, so that the transmission channels for data link between the plurality of vehicle controllers and the remote guidance and control apparatus are maintained.

The method of near real-time band jamming prevention according to the present invention is applied when the communication band currently in use by a vehicle controller and a remote guidance and control apparatus suffers from jamming. The vehicle controller is driven to judge immediately another communication band in normal condition, and switch from the jammed communication band to the normal communication band. In addition, the remote guidance and control apparatus is driven real-timely to the same communication band as the vehicle controller. First, measure the received signal strength intensities of a first communication band and a second communication band between the vehicle controller and the remote guidance and control apparatus. Then, compare the difference of the received signal strength intensities between the first communication band and the second communication band with a first reference value so that the corresponding actions can be executed accordingly. Besides, in accordance with the method of near real-time band jamming prevention according to the present invention, the vehicle controller judges if the received signal strength intensities between the first communication band and the second communication band are within the margin of error, and thereby determines if the communication band currently in use is maintained or not. Consequently, the transmission channel for data link between the vehicle controller and the remote guidance and control apparatus is maintained.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1A:
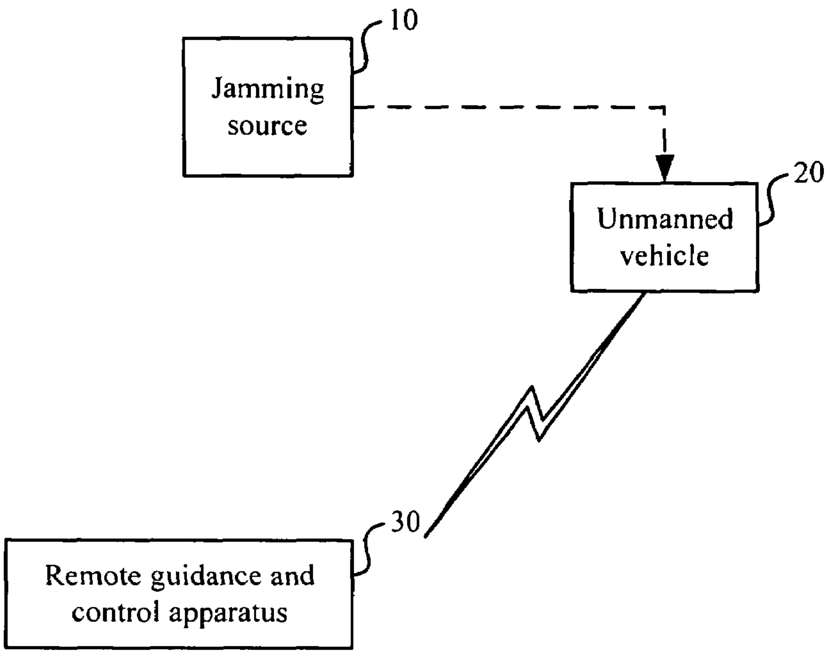
Figure 1A(prior art)
FIG. 1A shows a schematic diagram of uplink jamming on an unmanned vehicle system according to the prior art.
Figure 1B:
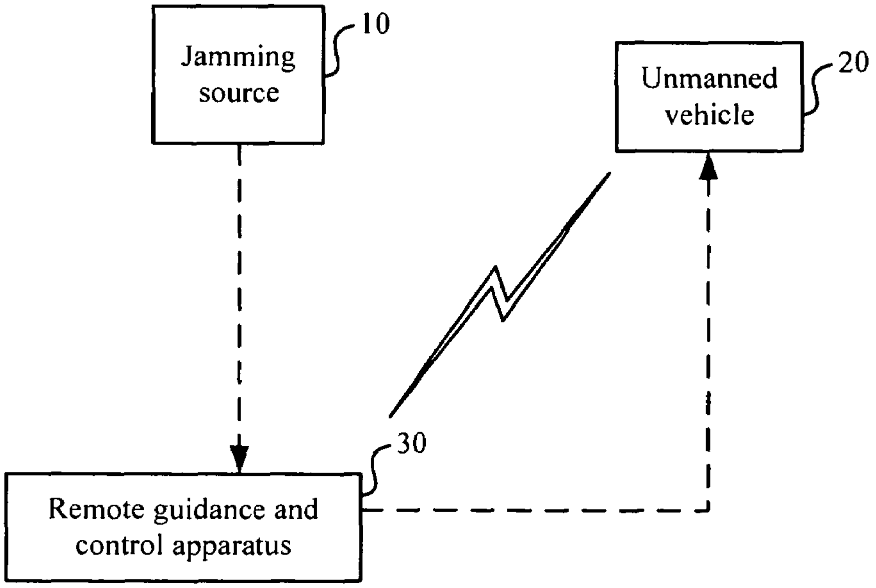
Figure 1B(prior art)
FIG. 1B shows a schematic diagram of downlink jamming on an unmanned vehicle system according to the prior art.
Figure 2:
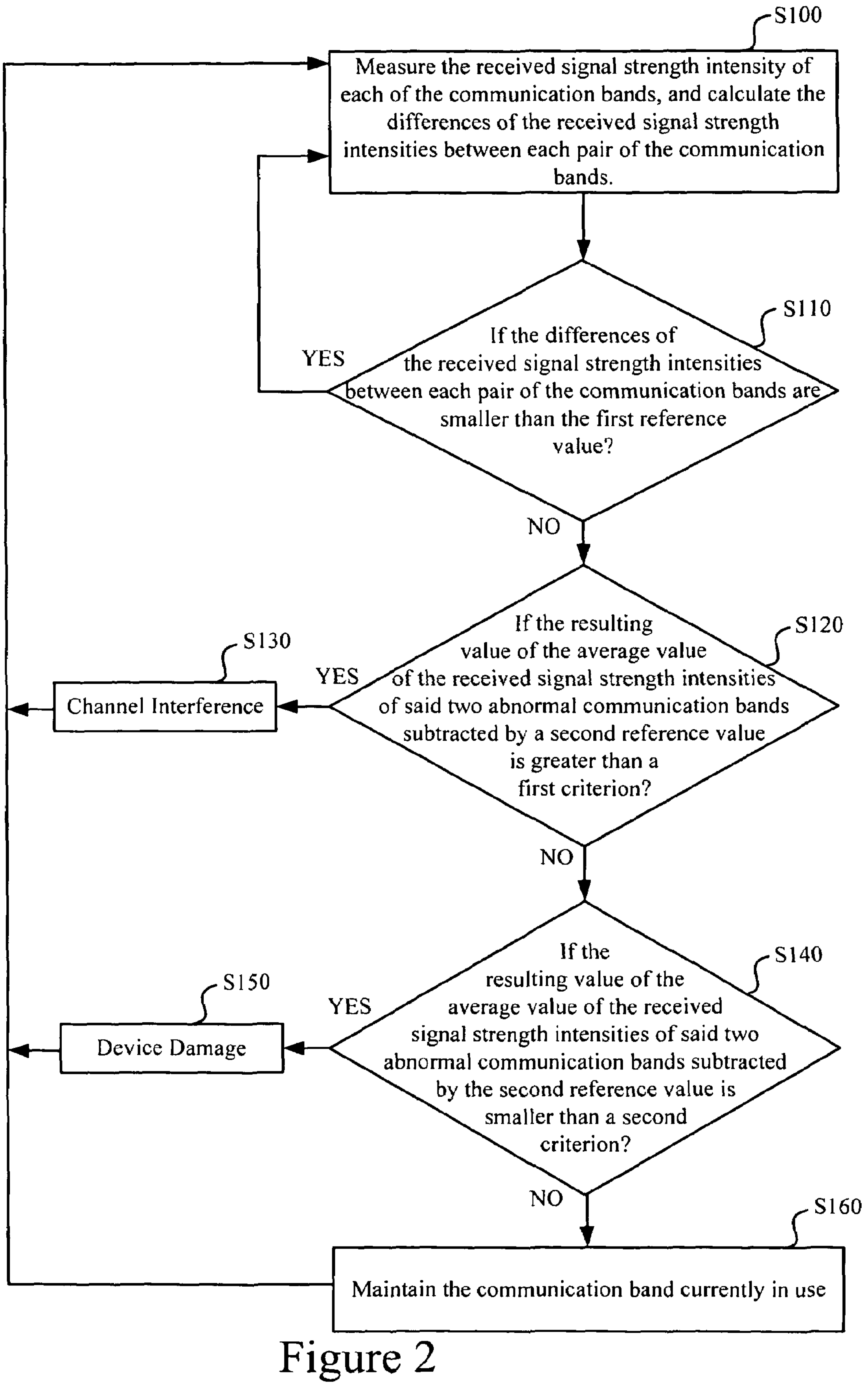
FIG. 2 shows a flowchart according to a preferred embodiment of the present invention.

FIG. 2 shows a flowchart according to a preferred embodiment of the present invention. As shown in the figure, the method of near real-time band jamming prevention according to the present invention provides a communication band judged to have better communication quality. The vehicle controller can thereby automatically determine a communication band between the vehicle controller and the remote guidance and control apparatus with better communication quality, and consequently switch from a jammed communication channel to an unjammed one. According to the step S100, measure the received signal strength intensity of each of the communication bands, and calculate the differences of the received signal strength intensities between each pair of the communication bands. Then, according to the step S110, compare the differences of the received signal strength intensities between each pair of the communication bands with a first reference value for judging if the differences of the received signal strength intensities between each pair of the communication bands is normal or not. If the differences of the received signal strength intensities between each pair of the communication bands are smaller than the first reference value, it is judged that all of the communication bands can transmit signals normally. Hence, the step S100 is re-executed to re-measure the received signal strength intensity of each of the communication bands. On the other hand, if the difference of the received signal strength intensities between two communication bands is greater than the first reference value, it is judged that said two communication bands are in abnormal condition. Thereby, the judgment in the step S120 is executed subsequently.

The first reference value is a reference value for differences of received signal strength intensities caused by attenuation in received signal strength intensities due to path losses. It is used for comparing differences of received signal strength intensities between pairs of communication bands. In the step S110, if two of the communication bands are judged abnormal, then the average value of the received signal strength intensities of said two communication bands is subtracted by a second reference value for further judgment. According to the step S120, if the resulting value of the average value of the received signal strength intensities of said two abnormal communication bands subtracted by the second reference value is greater than a first criterion, it means that the communication band currently in use by the vehicle controller suffers from jamming by a jamming source. Then the step S130 is executed subsequently. However, if the resulting value of the average value of the received signal strength intensities of said two abnormal communication bands subtracted by the second reference value is not greater than the first criterion, the step S140 is executed subsequently. According to the step S130, the vehicle controller is driven to switch the communication band currently in use to another communication band with better communication quality, and the remote guidance and control apparatus is also switched real-timely to the same communication band used by the vehicle controller.

Afterwards, according to the step S140, if the resulting value of the average value of the received signal strength intensities of said two abnormal communication bands subtracted by the second reference value is smaller than a second criterion, it means that the wireless transmitter and receiver of the vehicle controller is damaged using the current communication band. Then the step S150 is executed subsequently for driving the vehicle controller to switch the communication band currently in use to another communication band, and the remote guidance and control apparatus is also switched real-timely to the same communication band used by the vehicle controller. Thereby, the transmission channel for data link therebetween is resumed. However, if the resulting value of the average value of the received signal strength intensities of said two abnormal communication bands subtracted by the second reference value is not smaller than the second criterion, then the step S160 is executed subsequently. The first criterion and the second criterion are the upper bound and lower bound of errors in measuring communication bands, respectively. Thereby, if switching communication band is not needed after the step S140, it is judged that the difference of received signal strength intensities between the two communication bands falls within the margin of error. Then, according to the step S160, the vehicle controller is driven to maintain the communication band currently in use for transmitting signals to the remote guidance and control apparatus as well as receiving signals transmitted by the remote guidance and control apparatus.

Figure 3:
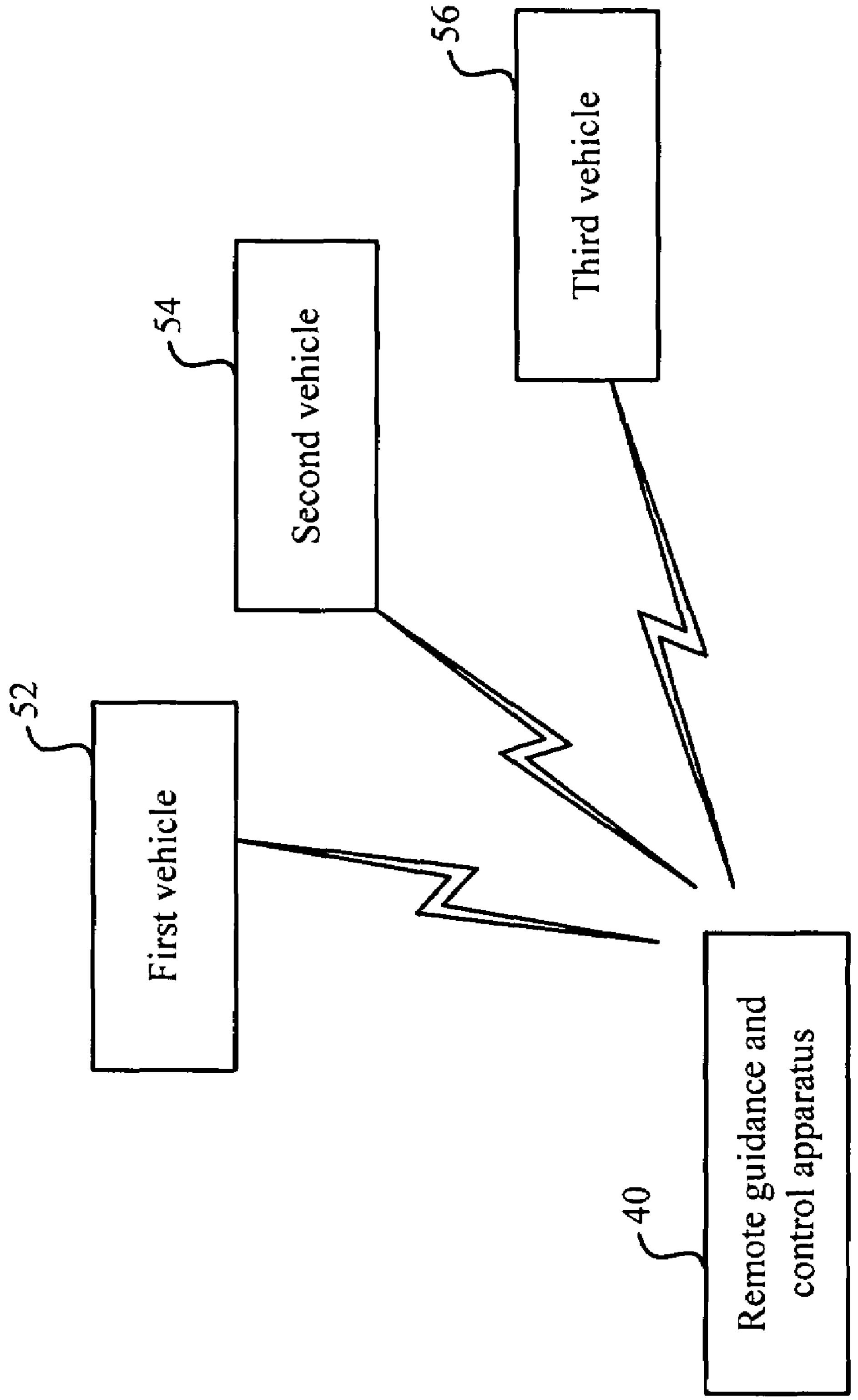
FIG. 3 shows a schematic diagram of remotely guiding and controlling according to a preferred embodiment of the present invention.
Figure 4:
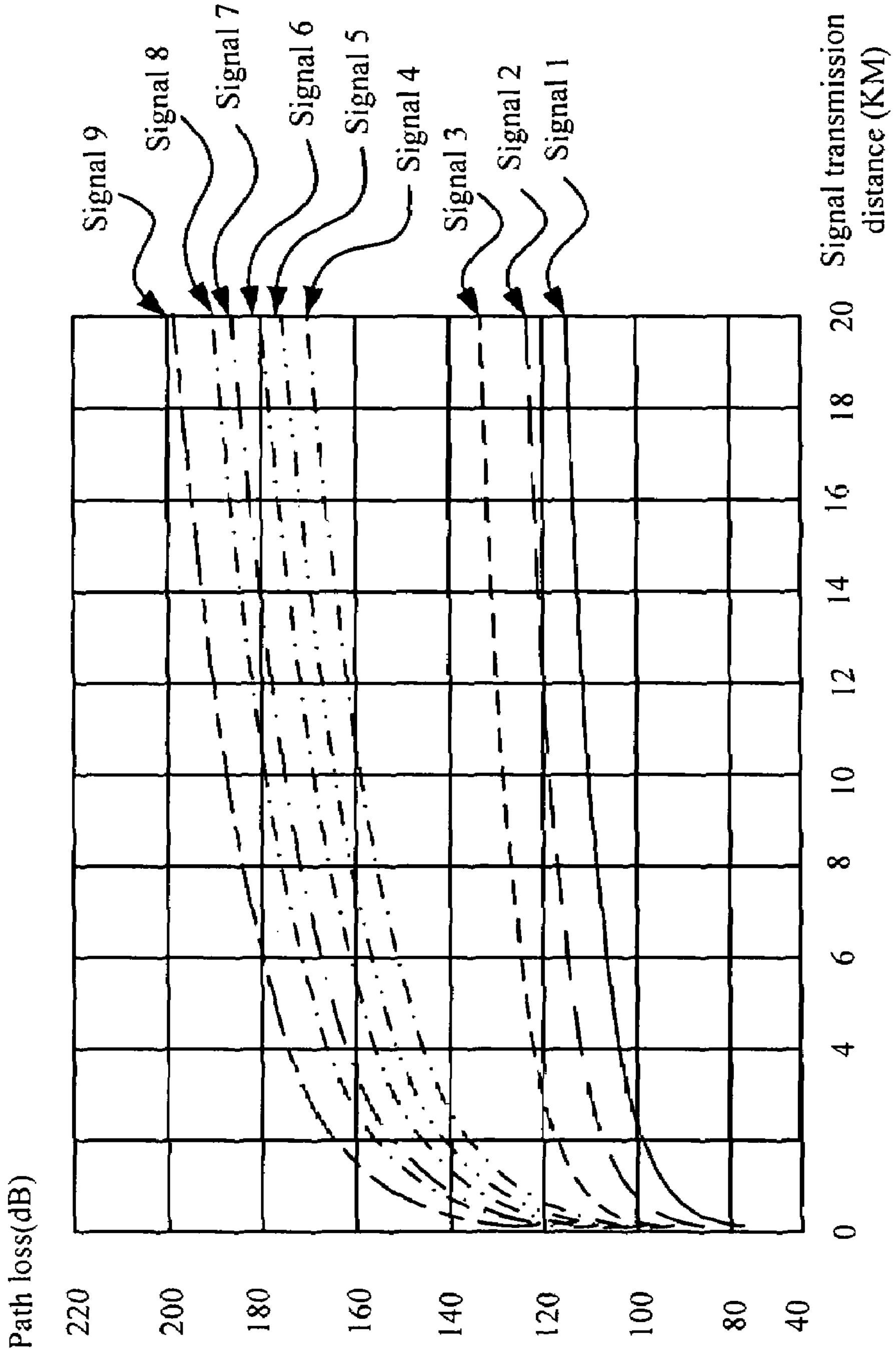
FIG. 4 shows curves of path losses for various signals according to a preferred embodiment of the present invention.

FIG. 3 shows a schematic diagram of remotely guiding and controlling according to a preferred embodiment of the present invention. As shown in the figure, the method of near real-time band jamming prevention according to the present invention provides a remote guidance and control apparatus 40 for operating a first vehicle 52, a second vehicle 54, and a third vehicle 56. In addition, there exists at least one independent transmission channel for data link between each of the first vehicle 52, the second vehicle 54, the third vehicle 56, and the remote guidance and control apparatus 40, respectively. The received signal strength intensities between each of the first vehicle 52, the second vehicle 54, the third vehicle 56, and the remote guidance and control apparatus 40, respectively, will attenuate with the increase of transmitting distances because of loss of more power, that is, the path losses, as shown in FIG. 4. Signal 1 to Signal 3 are Very-High-Frequency (VHF), Ultra-High-Frequency (UHF), and L-band signals in the free space between the first vehicle 52, the second vehicle 54, the third vehicle 56, and the remote guidance and control apparatus 40, respectively. The curves shown are path losses of signals in the free space. Signal 4 to Signal 6 are VHF, UHF, and L-band signals in the suburbs between the first vehicle 52, the second vehicle 54, the third vehicle 56, and the remote guidance and control apparatus 40, respectively. The curves shown are path losses of signals in the suburbs. Signal 7 to Signal 9 are VHF, UHF, and L-band signals in the urban areas between the first vehicle 52, the second vehicle 54, the third vehicle 56, and the remote guidance and control apparatus 40, respectively. The curves shown are path losses of signals in the urban areas.

Figure 5:
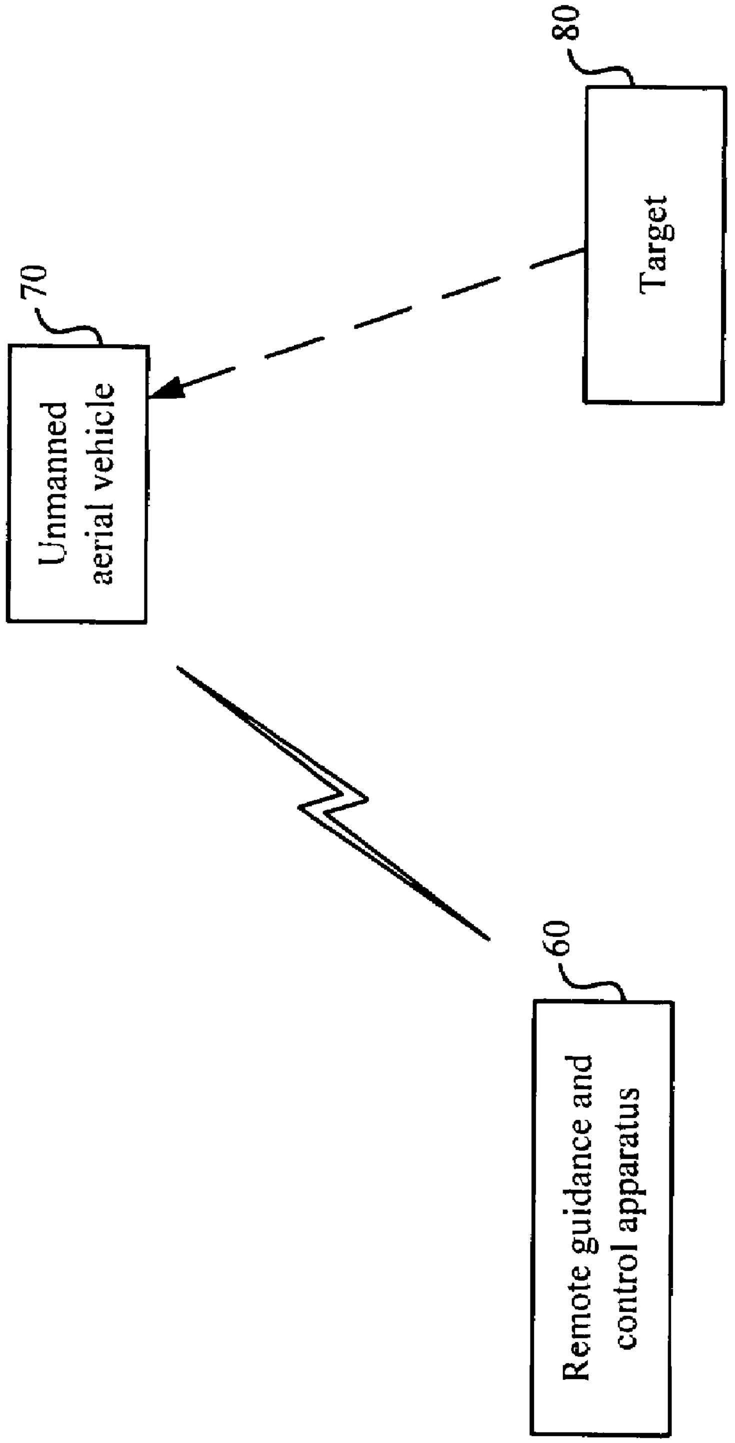
FIG. 5 shows a schematic diagram of remotely guiding and controlling a single vehicle according to a preferred embodiment of the present invention.
Figure 6:
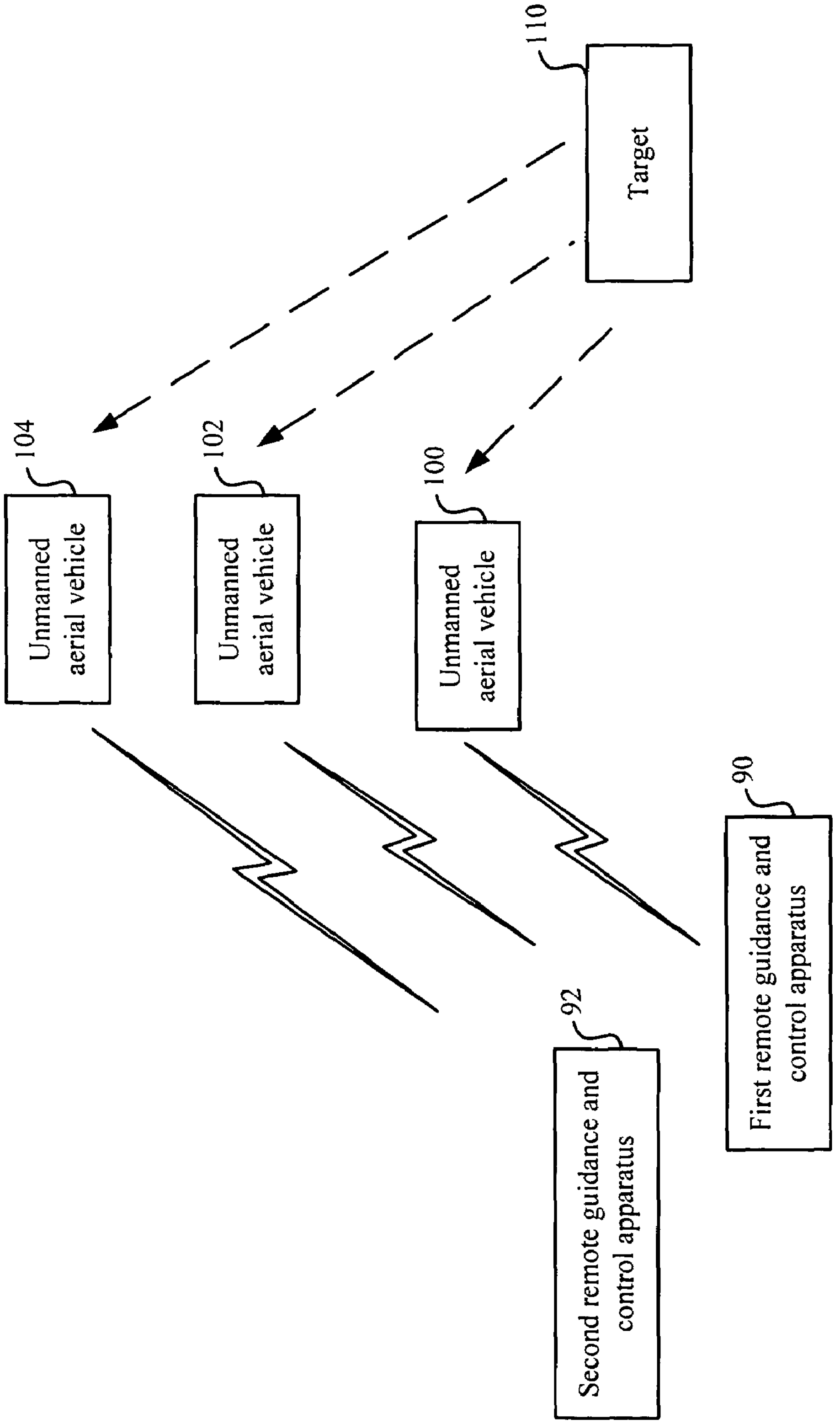
FIG. 6 shows a schematic diagram of remotely guiding and controlling multiple vehicles according to a preferred embodiment of the present invention.

In addition, as shown in FIG. 5, the method of near real-time band jamming prevention according to the present invention can be further applied to remotely guiding and controlling a single vehicle. A remote guidance and control apparatus 60 controls an unmanned aerial vehicle 70 to perform a flight mission by way of a plurality of frequency bands. The transmission channel for data link of the unmanned aerial vehicle 70 will not be interrupted by external jamming sources. For example, the remote guidance and control apparatus 60 controls the unmanned aerial vehicle 70 for a mission of telemetering images of a target 80. Besides, as shown in FIG. 6, the method of near real-time band jamming prevention according to the present invention can be further applied to remotely guiding and controlling multiple vehicles. A first remote guidance and control apparatus 90 and a second remote guidance and control apparatus 92 control a first unmanned aerial vehicle 100, a second unmanned aerial vehicle 102, and a third unmanned aerial vehicle 104, respectively, to perform flight missions by way of a plurality of frequency bands. There exists a communication band between the first unmanned aerial vehicle 100, the second unmanned aerial vehicle 102, the third unmanned aerial vehicle 104, and the first remote guidance and control apparatus 90, respectively. In addition, there exists another communication band between the unmanned aerial vehicles and the second remote guidance and control apparatus 92. Because there is a plurality of bands as transmission channels for data link between the first unmanned aerial vehicle 100, the second unmanned aerial vehicle 102, the third unmanned aerial vehicle 104, and the first remote guidance and control apparatus 90, and between the unmanned aerial vehicles and the second remote guidance and control apparatus 92, respectively, the first unmanned aerial vehicle 100, the second unmanned aerial vehicle 102, and the third unmanned aerial vehicle 104 will switch bands automatically to prevent external band jamming, and drive real-timely the first remote guidance and control apparatus 90 and the second remote guidance and control apparatus 92 switch, respectively, to the same communication bands of the first unmanned aerial vehicle 100, the second unmanned aerial vehicle 102, and the third unmanned aerial vehicle 104. For example, the first remote guidance and control apparatus 90 and the second remote guidance and control apparatus 92 control the first unmanned aerial vehicle 100, the second unmanned aerial vehicle 102, and the third unmanned aerial vehicle 104 for a mission of telemetering images of a target 110.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A method of near real-time band jamming prevention, comprising the steps of:

measuring by a vehicle controller the received signal strength intensities of at least two samples of a first communication band and at least two samples of a second communication band;

determining by the vehicle controller if a difference of the received signal strength intensities between each of said samples of the first communication band and the second communication band is greater than a first reference value;

determining by the vehicle controller an average value of said samples of the received signal strength intensities between the first communication band and the second communication band;

wherein if the resulting value of the average value of the received signal strength intensities between the first communication band and the second communication band subtracted from a second reference value is determined to be greater than a first criterion, then the vehicle controller switches the first communication band to another communication band; if the resulting value of the average value of the received signal strength intensities between the first communication band and the second communication band subtracted by the second reference value is determined to be smaller than a second criterion, then the vehicle controller switches the first communication band to another communication band.

2. The method of near real-time band jamming prevention of claim 1, wherein if the resulting value of the average value of the received signal strength intensities between the first communication band and the second communication band subtracted from the second reference value is determined to be smaller than the first criterion and greater than the second criterion, then maintain the communication band to the first communication band.

3. The method of near real-time band jamming prevention of claim 2, wherein in the step of maintaining the communication band to the first communication band, the vehicle controller is driven to maintain the communication band.

4. The method of near real-time band jamming prevention of claim 1, wherein the first reference value is calculated by the vehicle controller according to a path loss.

5. The method of near real-time band jamming prevention of claim 1, wherein if the step of determining if the resulting value of the average value of the received signal strength intensities between the first communication band and the second communication band subtracted from the second reference value is determined to be greater than the first criterion, the received signal strength intensities of the first communication band and the second communication band are determined to be jammed by noise.

6. The method of near real-time band jamming prevention of claim 1, wherein if the step of determining if the resulting value of the average value of the received signal strength intensities between the first communication band and the second communication band subtracted by the second reference value is determined to be smaller than the second criterion, the communication apparatuses of the first communication band and the second communication band are determined to be damaged.

7. The method of near real-time band jamming prevention of claim 1, wherein the first communication band and the second communication band are transmission channels for data link between the vehicle controller and a remote guidance and control apparatus.

8. A method of near real-time band jamming prevention, comprising the steps of:

determining by a vehicle controller if a difference of a received signal strength intensity between at least two samples of a first communication band and at least two samples of a second communication band is greater than a first reference value;

determining by the vehicle controller an average value of said samples of the received signal strength intensities between the first communication band and the second communication band;

wherein if the resulting value of the average value of the received signal strength intensities between the first communication band and the second communication band subtracted from a second reference value is determined to be greater than a first criterion, then the vehicle controller switches the first communication band to another communication band; if the resulting value of the average value of the received signal strength intensities between the first communication band and the second communication band subtracted by the second reference value is determined to be smaller than a second criterion, then the vehicle controller switches the first communication band to another communication band.

9. The method of near real-time band jamming prevention of claim 8, wherein if the resulting value of the average value of the received signal strength intensities between the first communication band and the second communication band subtracted from the second reference value is determined to be smaller than the first criterion and greater than the second criterion, then maintain the communication band to the first communication band.

10. The method of near real-time band jamming prevention of claim 9, wherein in the step of maintaining the communication band to the first communication band, the vehicle controller is driven to maintain the communication band.

11. The method of near real-time band jamming prevention of claim 8, wherein the first reference value is calculated by the vehicle controller according to a path loss.

12. The method of near real-time band jamming prevention of claim 8, wherein if the step of determining if the resulting value of the average value of the received signal strength intensities between the first communication band and the second communication band subtracted by the second reference value is determined to be greater than the first criterion, the received signal strength intensities of the first communication band and the second communication band are determined to be jammed by noises.

13. The method of near real-time band jamming prevention of claim 8, wherein if the step of determining if the resulting value of the average value of the received signal strength intensities between the first communication band and the second communication band subtracted by the second reference value is determined to be smaller than the second criterion, communication apparatus of the first communication band and the second communication band are determined to be damaged.

14. The method of near real-time band jamming prevention of claim 8, wherein the first communication band and the second communication band are transmission channels for data link between the vehicle controller and a remote guidance and control apparatus.

* * * * *